(12) United States Patent
Lee et al.

(10) Patent No.: US 9,191,480 B2
(45) Date of Patent: Nov. 17, 2015

(54) METHOD FOR PERFORMING ALARM FUNCTION AND ELECTRONIC DEVICE THEREOF

(71) Applicant: Samsung Electronics Co., Ltd, Gyeonggi-do (KR)

(72) Inventors: Ki-Wan Lee, Gyeonggi-do (KR); Do-Hun Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 80 days.

(21) Appl. No.: 14/191,255

(22) Filed: Feb. 26, 2014

(65) Prior Publication Data

US 2014/0240138 A1    Aug. 28, 2014

(30) Foreign Application Priority Data

Feb. 26, 2013    (KR) .................... 10-2013-0020343

(51) Int. Cl.
```
G08B 21/18      (2006.01)
G06K 19/07      (2006.01)
H04W 52/02      (2009.01)
H04M 1/725      (2006.01)
G06F 1/28       (2006.01)
```
(52) U.S. Cl.
CPC ........... *H04M 1/7253* (2013.01); *G08B 21/182* (2013.01); *H04W 52/0277* (2013.01); *G06F 1/28* (2013.01); *G06K 19/0723* (2013.01); *Y02B 60/50* (2013.01)

(58) Field of Classification Search
CPC .................... H04W 52/0277; H04W 52/0264; H04W 52/027; H04W 52/029; H04W 52/0296; H04W 52/283; H04W 52/288; G06F 1/28; G06F 1/266; G06F 1/30; G06F 2200/261; G06K 19/0723; G06K 19/07788; G08B 13/2417; G08B 13/2437; G08B 13/2445; G08B 21/02; G08B 21/185; H01H 47/001; H01M 10/0525; H01M 10/30; H01M 10/345; H01M 10/46; H01M 10/48; H04B 5/0056; H04B 5/02; H04N 5/23241; H04N 5/23293; H02J 7/0047

See application file for complete search history.

(56) References Cited

U.S. PATENT DOCUMENTS

| | | | | |
|---|---|---|---|---|
| 5,870,685 | A * | 2/1999 | Flynn | 455/573 |
| 5,986,706 | A * | 11/1999 | Hirasawa | 348/372 |
| 6,124,797 | A * | 9/2000 | Mercado | 340/636.15 |
| 6,310,556 | B1 * | 10/2001 | Green et al. | 340/636.15 |
| 6,345,180 | B1 * | 2/2002 | Reichelt | 455/404.1 |
| 6,408,196 | B2 * | 6/2002 | Sheynblat et al. | 455/574 |
| 6,501,195 | B1 * | 12/2002 | Barton | 307/125 |

(Continued)

FOREIGN PATENT DOCUMENTS

| | | |
|---|---|---|
| KR | 10-2009-0131831 | 12/2009 |
| KR | 10-2011-0001408 | 1/2011 |

*Primary Examiner* — Fekadeselassie Girma

(57) ABSTRACT

A method for operating an electronic device includes: determining whether a battery remaining power amount of the electronic device is lower than or equal to a reference remaining power amount with which a power supply of the electronic device is maintained in a turned-on state until a time at which an alarm is set to be activated; and transmitting alarm information about the alarm to a second electronic device. The alarm information is information configured by an instruction prearranged between the electronic device and the second electronic device to enable the second electronic device to set an alarm function according to the alarm information automatically after reception of the alarm information.

20 Claims, 12 Drawing Sheets

(56) References Cited

U.S. PATENT DOCUMENTS

| | | |
|---|---|---|
| 6,668,179 B2* | 12/2003 | Jiang .................... 455/572 |
| 6,833,792 B1* | 12/2004 | Smith et al. .......... 340/636.19 |
| 2003/0062996 A1* | 4/2003 | Flanagan et al. ........ 340/457 |
| 2005/0268131 A1* | 12/2005 | Matsunobu ............ 713/323 |
| 2006/0109129 A1* | 5/2006 | Carrender ............. 340/572.7 |
| 2009/0093279 A1* | 4/2009 | Matsuura .............. 455/574 |
| 2010/0052930 A1 | 3/2010 | Grigsby et al. |
| 2011/0114608 A1* | 5/2011 | Albrecht .............. 219/112 |
| 2013/0215156 A1* | 8/2013 | Li et al. ............... 345/690 |

* cited by examiner

METHOD FOR PERFORMING ALARM FUNCTION AND ELECTRONIC DEVICE THEREOF

PRIORITY

The present application is related to and claims priority under 35 U.S.C. §119 to an application filed in the Korean Intellectual Property Office on Feb. 26, 2013 and assigned Serial No. 10-2013-0020343, the contents of which are incorporated herein by reference.

TECHNICAL FIELD

The present disclosure relates to a method for performing an alarm function and an electronic device thereof.

BACKGROUND

With the development of mobile communication technology, an electronic device is used as an essential communication device for individuals. In addition, with the provision of various supplementary services, such as a camera, data communication, video replay, audio replay and messenger, schedule management, and alarm functions in addition to a voice communication function in the electronic device, the use of the electronic device has increased gradually. As the function of the electronic device is diversified and the use thereof increases, a battery becomes bigger. However, the use of the electronic device also increases, thereby decreasing the usable time of the battery.

Generally, a user prefers to use an alarm function along with various supplementary functions using the electronic device rather than a separate alarm clock. An alarm needs to be informed using sound so as for the user to know an event or schedule. However, the electronic device performing the alarm has a possibility that the battery is exhausted and the alarm function is not performed normally. Therefore, when there is a possibility that the battery is exhausted before the alarm is generated, there is a need for a method for improving reliability in performance of an alarm function.

SUMMARY

To address the above-discussed deficiencies, it is a primary object to provide a method and apparatus for transmitting event alarm information to a second electronic device and enabling the second electronic device to perform an alarm function instead when it is determined that the power supply of the electronic device is hardly maintained in a turned-on state until an event alarm time.

Another embodiment of the present disclosure provides a method and apparatus for resetting an alarm set in an electronic device so as to perform an alarm function before the power supply of the electronic device is turned off due to discharge of the battery of the electronic device when an electronic device fails to transmit event alarm information to a second electronic device.

Another embodiment of the present disclosure provides a method and apparatus for displaying a history such that a user know what an electronic device or a second electronic device performs when the electronic device having an insufficient battery transmits alarm information to the second electronic device or vice versa.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
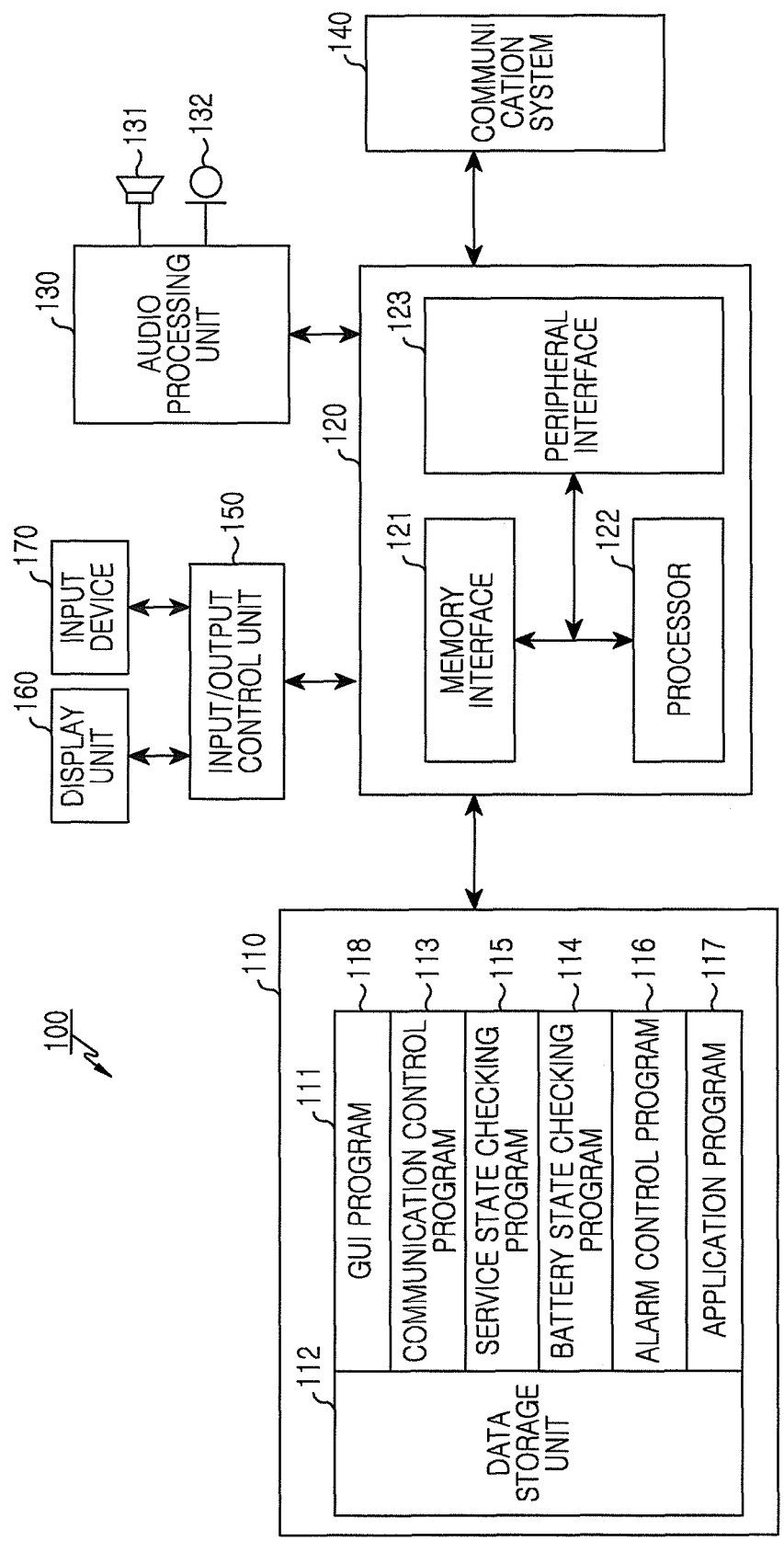
FIG. 1 illustrates a block configuration of an electronic device according to an embodiment of the present disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. Exemplary embodiments of the present disclosure will be described herein below with reference to the accompanying drawings. In the following description of the exemplary embodiments, detailed descriptions of well-known functions or configurations will be omitted since they would unnecessarily obscure the subject matters of the present disclosure. Also, the terms used herein are defined according to the functions of the present disclosure. Thus, the terms may vary depending on users' or operators' intentions or practices. Therefore, the terms used herein should be understood based on the descriptions made herein.

The present disclosure provides a technology of transmitting an alarm to a second electronic device connected to an electronic device 100 through a network and enabling the second electronic device to perform the alarm function of the electronic device 100 instead when a battery is exhausted and it is expected that an alarm to be performed is not performed in an electronic device 100, thereby improving reliability in the alarm function.

In the following description, examples of the electronic device 100 include a mobile communication terminal, a personal digital assistant (PDA), a personal computer (PC), a laptop computer, a smart phone, a netbook, a mobile internet device (MID), an ultra mobile personal computer (UMPC), a tablet PC, a navigation device, an MP3 player, all of which support a communication function, such as near field wireless communication including P2P communication, network communication through a base station or an AP, or text message transmission and reception, and an alarm function.

In addition, examples of the second electronic device include a mobile communication terminal, a personal digital assistant (PDA), a laptop computer, a smart phone, a netbook, a television, a mobile internet device (MID), an ultra mobile personal computer (UMPC), a tablet PC, a navigation device, an MP3 player, all of which support a communication function, such as near field wireless communication including P2P communication with the electronic device 100, network communication through a base station or an AP, or text message transmission and reception, and an alarm function.

In the following description, an alarm or an event alarm refers to use of notification with respect to various situations including a schedule, an event, a memo, a reserved transmission or the like, which a user wants to be informed of, as well as simple time notification. The event alarm will be described separately from the alarm but this is only for contextual distinction, and semantic difference therebetween is slight.

In addition, alarm data which is transmitted from the electronic device 100 to the second electronic device, or vice versa is expressed as event alarm information and alarm information which are only for contextual distinction, and semantic difference therebetween is slight like the case of the event alarm and the alarm.

When it is expected that the alarm is not performed because the battery of electronic device 100 is exhausted, the electronic device 100 transmits the alarm information of the electronic device 100 to the second electronic device through network communication using wireless resources and enables the second electronic device to perform an alarm function instead according to the alarm information without a separate manipulation.

FIG. 1 illustrates a block configuration of an electronic device 100 according to an embodiment of the present disclosure.

Referring to FIG. 1, the electronic device 100 includes a memory 110, a processor unit 120, a communication system 140, an audio processing unit 130, a speaker 131, a microphone 132, an input/output control unit 150, a display unit 160, and an input device 170.

In this case, the memory may be configured in plurality.

The memory 110 may include a program storage unit 111 for storing a program for controlling an operation of the electronic device 100, and a data storage unit 112 for storing data generated during the execution of a program. For example, the data storage unit 112 stores information about an event alarm to be transmitted to a second electronic device. The event alarm information is input from a user through an alarm control program 116 and stored in the data storage unit 112.

The program storage unit 111 includes a user graphic interface (GUI) program 118, a service state checking program 115, a battery state checking program 114, an alarm control program 116, a communication control program 113, and at least one application program 117. In this case, the programs stored in the program storage unit 111 may be expressed as an instruction set that is a collection of instructions.

The GUI program 118 includes at lease one software component for providing a graphic user interface on a display unit 160. For example, the GUI program 118 includes an instruction for displaying information about application programs executed by the processor 122 on the display unit 160. In this case, the GUI program 118 includes an instruction for displaying service state information which is checked through the service state checking program 115 on the display unit 160.

The communication control program 113 includes at least one software component for controlling communication with at least one second electronic device using the communication system 140. For example, the communication control program 113 searches for the second electronic device for communication connection. When the second electronic device for communication connection is found, the communication control program 113 establishes a connection for communication with the second electronic device. Thereafter, the communication control program 113 investigates the performance of the second electronic device connected to the electronic device, performs a session establishment process, and enables the communication system 140 to transmit and receive data, such as alarm information, to and from the second electronic device.

In addition, when the communication control program 113 is not able to connect to the found second electronic device, or fails to transmit and receive data, such as alarm information, even after connecting to the second electronic device, the communication control program 113 may again attempt to perform network connection according to the network connection priorities of second electronic devices, which are input in the alarm setting step through the alarm control program 116 and are stored in the data storage unit 112.

The service state checking program 115 may include at least one software component for checking the state of a service provided to the electronic device 100 or between the electronic device 100 and the second electronic device. For example, the service state checking program 115 identifies a service state, such as whether the event alarm information generated by the electronic device is completely transmitted to the second electronic device, whether the second electronic device receives the event alarm information through analysis of feedback information when a feedback is received from the second electronic device, or whether an alarm is set according to the received event alarm information.

As another example, the service state checking program 115 analyzes alarm information associated with an event alarm provided from the second electronic device and identifies whether information complete enough to set an alarm function without a separate manipulation is received, or whether the alarm function is set according to the alarm information. When there is a problem, the service state checking program 115 transmits a feedback indicating that there is the problem to the second electronic device which has transmitted the alarm information.

The battery state checking program 114 identifies and analyzes the state of a battery connected to the electronic device 100. For example, the battery state checking program 114 identifies how much is battery remaining power amount, whether a battery is being charged, and whether there is a problem in the battery. In addition, the battery state checking program 114 may collect and analyze state information representing, for example, which program use the battery or how much a program use the battery, and operates in cooperation with one or more other programs in order to identify the battery state.

The alarm control program 116 receives settings related to an event alarm from a user and performs an alarm function according to the settings information.

For example, the user not only may input basic alarm-related information, such as date, time, repetition times, an alarm repetition time interval, and specifics of the event alarm, also may determine a method for operating a peripheral device, such as a sensor used to identify the state of the electronic device 100 and a method for performing an alarm function, through the alarm control program 116. In addition, through the alarm control program 116, the user may determine whether to enable the second electronic device to receive the alarm information and perform the alarm function instead, generate a list of second electronic devices to be connected thereto through a network, and, if necessary, assign priorities to the second electronic devices to be connected through the network which are include in the list.

The settings received from the user through the alarm control program 116 are stored in the data storage unit 112 and the alarm function is performed based on the information stored in the data storage unit 112.

The application program 117 includes a software component for at least one application program installed in the electronic device 100.

The processor unit 120 includes a memory interface 121, at least one processor 122, and a peripheral interface 123. In this case, the memory interface 121, the at least one processor 122 and the peripheral interface 123 which are included in the processor unit 120 may be integrated into at least one integrated circuit or be implemented as separate components.

The memory interface 121 controls access to the memory 100 of components, such as the processor 122 or the peripheral interface 123.

The peripheral interface 123 controls connections of the input/output peripherals of the electronic device 100 to the processor 122 and the memory interface 121.

The processor 122 enables the electronic device 100 to provide a service for allowing a user to identify the state of a battery, to transmit and receive information through communication, and to identify the operation of the electronic device via the display unit, using at least one software program. In this case, the processor 122 executes at least one program stored in the memory 110 and provides a service corresponding to the program.

The audio processing unit 130 provides an audio interface between a user and the electronic device 100 through a speaker 131 and a microphone 132.

The communication system 140 provides a function for voice communication and data communication. In this case, the communication system may be classified into a plurality of communication sub-modules which support different communication networks. For example, the communication networks may include, but not limited to, a Global System for Mobile communication (GSM) network, an Enhanced Data GSM Environment (EDGE) network, a Code Division Multiple Access (CDMA) network, a W-Code Division Multiple Access (W-CDMA) network, a Long Term Evolution (LIE) network, an Orthogonal Frequency Division Multiple Access (OFDMA) network. The communication system 140 may be configured by including at least one of near field wireless communication methods, such as infrared data association (IrDA), wireless LAN, Bluetooth, and Near Field Communication (NFC), and may perform communication with the second electronic device.

The input/output control unit 150 provides an interface between an input/output device, such as the display unit 160 and the input device 170, and the peripheral interface 123.

The input device 170 provides input data generated by the selection of the user to the processor unit 120 through the input/output control unit 150. For example, the input device 170 is configured by including only control buttons for control of the electronic device 100. As another example, the input device 170 may be configured by a keypad for receiving input data from the user. As another example, the input device 170 may be implemented by the display unit 160 according to a touchscreen method. In this case, the touchscreen method may use a capacitive type touchscreen, a resistive type touchscreen or the like. The user may input information for an event alarm, a condition for transmission of alarm information, or the operation conditions of sensors and peripheral devices for detection of the state of the electronic device 100 through an input device, such as a keypad or an input device connected to the display unit, to enable the electronic device 100 to execute an instruction.

The display unit 160 displays the state information of the electronic device 100, characters input by the user, moving pictures, still pictures, or the like. For example, the display unit 160 displays information about application programs executed by the processor 122. When the set alarm information is transmitted to the second electronic device through the communication system 140, the display unit 160 displays the state and history of a service that is provided to the second electronic device.

Although not illustrated in the drawings, a sensor platform containing sensors may be included. For example, the sensor platform may include an illuminance sensor, an acceleration sensor, a gyroscope (gyro) sensor, or the like, making it possible to detect the state of the electronic device 100 using digitized information from the sensor platform. In addition, the sensors of the sensor platform may be implemented as independent modules to respectively perform their own functions independently of the processor 122, or be configured to operate sequentially.

The illuminance sensor may measure an illuminance around the electronic device 100 and digitize the same. The acceleration sensor may measure the acceleration of the electronic device 100 or dynamic force, such as impact or vibration, applied to the electronic device 100 and digitize the same. In addition, since the acceleration sensor detects the direction of gravity in a case where there is no external impact, the acceleration sensor may serve as a tilt sensor to measure change in the tilt of the electronic device 100 and digitize the same. The gyroscope may measure the rotation and rotary inertia, such as rotation speed (angular speed), of the electronic device 100 and digitize the same.

The processor 122 may determine the state of the electronic device by using the digitized information collected from the sensor platform.

Figure 2:
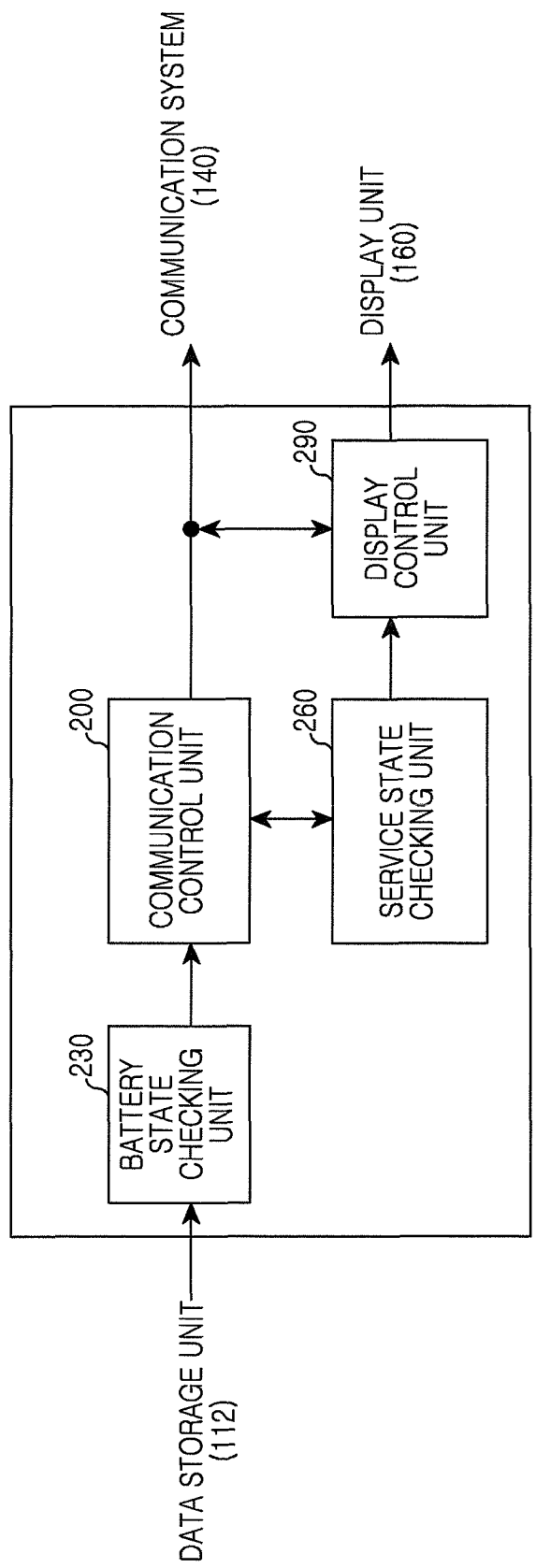
FIG. 2 illustrates a detailed block configuration of a processor according to an embodiment of the present disclosure.

FIG. 2 illustrates a detailed block configuration of a processor according to an embodiment of the present disclosure.

Referring to FIG. 2, a processor 122 includes a communication control unit 200, a battery state checking unit 230, and a service state checking unit 260.

The communication control unit 200 executes a communication control program 113 stored in the program storage unit 111 and controls network communication with at least one second electronic device using the communication system 140. For example, the communication control unit 200 searches for a second electronic device for communication connection via a network. When the second electronic device for communication connection is found, the communication control unit 200 sets a connection for communication with the second electronic device. Thereafter, the communication control unit 200 investigates the performance of the second electronic device in which the connection is set, performs a session establishment process, and enables the communication system 140 to transmit and receive data required for an alarm function, to and from the second electronic device.

The service state checking unit 260 identifies the state of a service provided to the second electronic device through the communication system 140. For example, the service state checking unit 260 identifies the state of a service which is performed in cooperation with the second electronic device based on state information identifying whether there is a problem in the network connection through the communication system 140 or in data transmission and reception, whether transmission of alarm data to the second electronic device is successful, or whether the second electronic device receives and sets the alarm information in cooperation with the service state checking program 115 stored in the program storage unit 111.

The display control unit 290 executes a GUI program 118 stored in the program storage unit 111 and provides a graphic user interface on the display unit 160. For example, the display control unit 290 displays information about an application program executed by the processor 122 on the display unit 160. In this case, the display control unit 290 displays information about a service state identified by the service state checking unit 260 on the display unit 160.

Figure 7A:
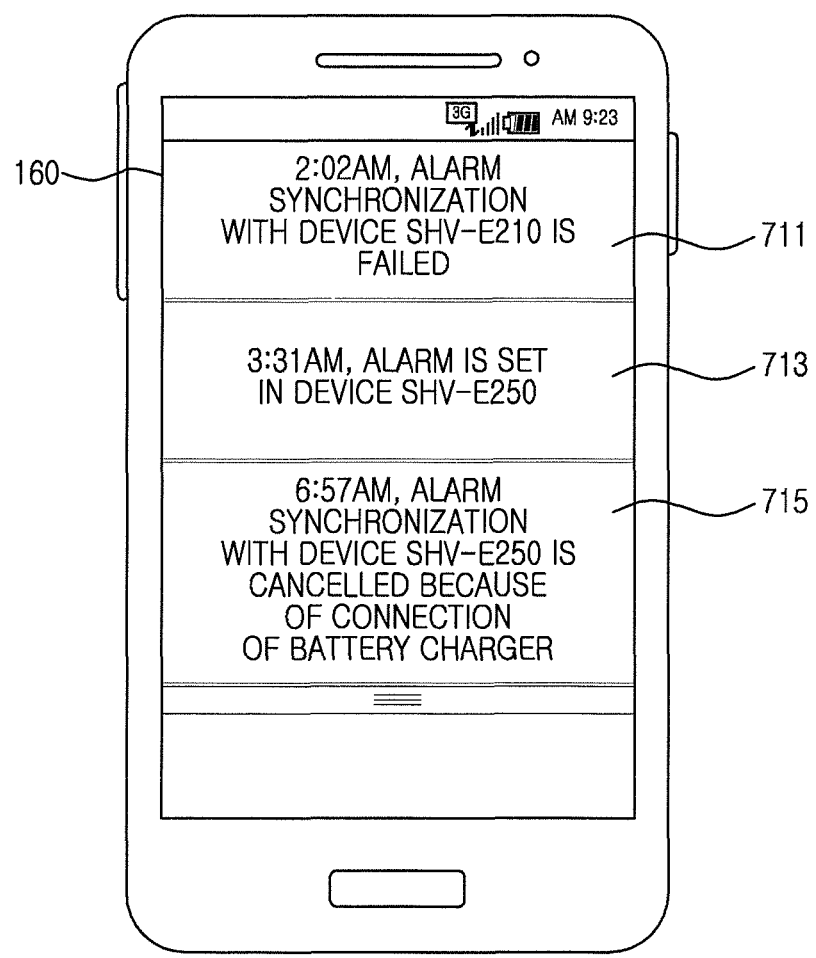
FIG. 7A illustrates an example of displaying the processing result history (feedback) of an alarm function on a display unit in the electronic device according to an embodiment of the present disclosure.

According to control of the above-described display control unit 290, the display unit 160 displays, on a partial region of a service screen, state information associated with a process in which the electronic device 100 transmits event alarm information to the second electronic device to enable the second electronic device to perform an alarm function instead as illustrated in FIG. 7A.

The battery state checking unit 230 manages the power of the electronic device 100 by using a battery state checking program 114. For example, the battery state checking unit 230 determines the charge amount of a battery, an estimated remaining usable time in the electronic device 100 or the like through the battery state checking program 114 or using a system for measuring a battery remaining power that is physically attached to the battery, and controls power supplied to the electronic device 100.

As described above, the electronic device 100 includes the communication control unit 200, the service state checking unit 260, and the battery state checking unit 230, checks the state information of a network service associated with the second electronic device using the processor 122, and displays the state information of the network service associated with the second electronic device through the display control unit 290.

The second electronic device that performs network communication with the electronic device 100 may include configurations identical to those of the electronic device 100 of FIG. 1 and the processor 122 of FIG. 2.

In this case, the service state checking unit of the second electronic device executes a service state checking program stored in a program storage unit and determines whether the alarm information provided from the electronic device 100 is transmitted. For example, when there is error in the event alarm information provided from the electronic device 100, the service state checking unit of the second electronic device may determine whether error occurs in consideration of error codes, such as the CRC of the alarm information.

The communication control unit of the second electronic device executes a communication control program stored in the program storage unit and controls network communication with the electronic device 100. In this case, the communication control unit of the second electronic device transmits service state information identified by the service state checking unit to the electronic device 100. For example, the communication control unit may transmit service state information about respective transmissions to the electronic device 100 by using an extension field according to the real-time transport (RTP) standard.

Figure 3A:
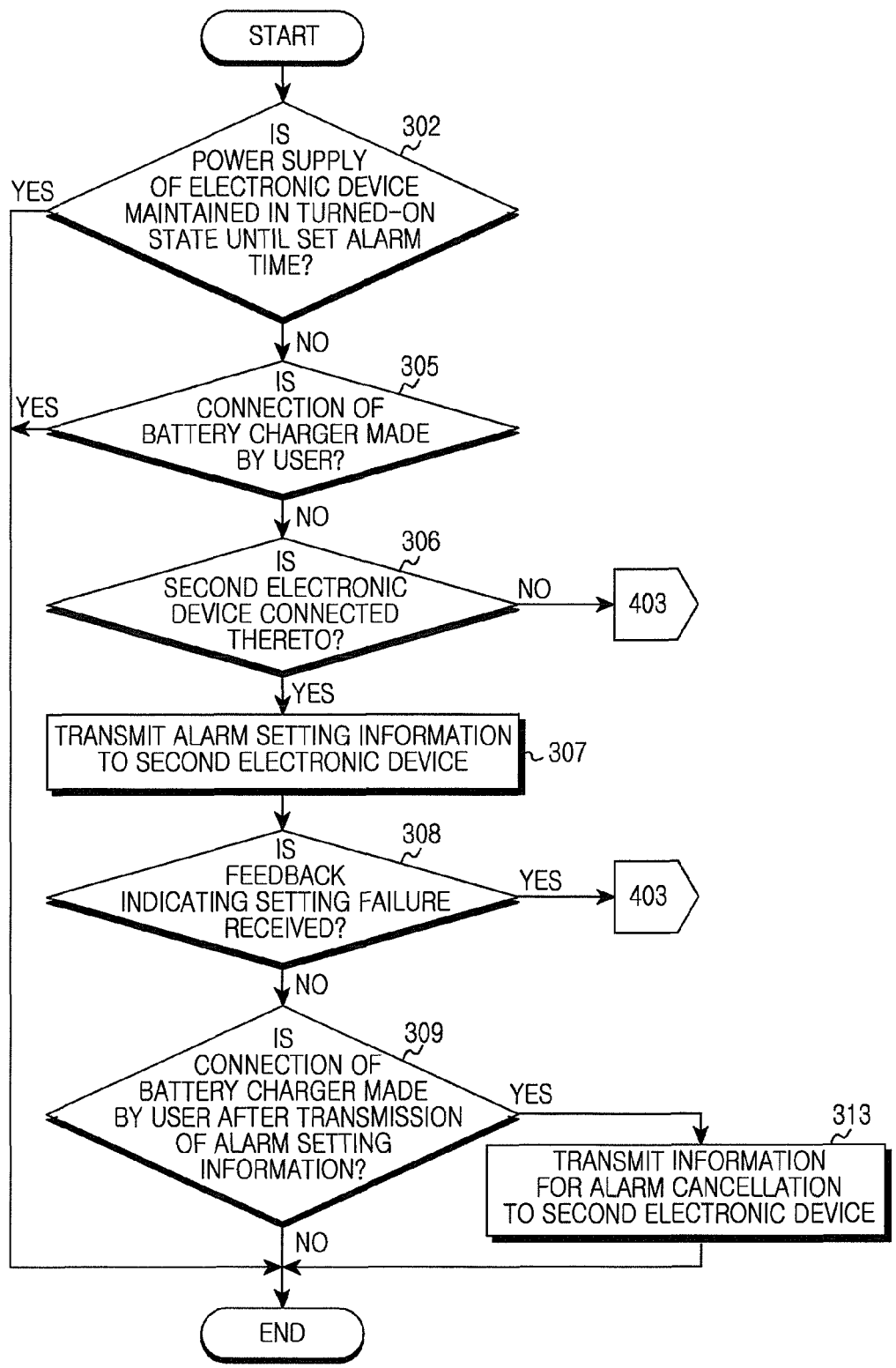
FIG. 3A illustrates a specific flowchart of transmitting an event alarm to a second electronic device in an electronic device according to an embodiment of the present disclosure.

FIG. 3A illustrates a specific flowchart of transmitting an event alarm to a second electronic device in an electronic device 100 according to an embodiment of the present disclosure.

A main object of the present disclosure is to transmit event alarm information to a second electronic device in an electronic device 100 to enable the second electronic device to perform the event alarm of the electronic device 100 instead, in order to cope with a situation in which, when the battery of the electronic device 100 does not have sufficient remaining power, the battery is exhausted and the alarm of an event stored in the data storage unit 112 of the electronic device 100 is not performed normally. In order to achieve the above object successfully, it is important to identify the remaining power amount of the battery and the estimated remaining usable time of the battery.

Referring to FIG. 3A, in step 302, the processor 122 determines whether the power supply of the electronic device 100 is maintained in a turned-on state until an event alarm time set by the alarm control program 166 based on information about the battery remaining power amount of the electronic device 100.

In order to determine a state, such as the battery remaining power amount in the electronic device 100, for example, the processor 122 may collect information, such as a battery's capacity, the current charge amount of the battery, the output voltage of the battery through the battery state checking program 114 of the electronic device 100, and use a method for determining the remaining power amount of the battery based on the information, or a method for determining the remaining power amount of the battery based on information, such as the battery's capacity, the current charge amount of the battery and the output voltage of the battery in a system for measuring a battery remaining power that is physically attached to the battery.

Therefore, the processor 122 may identify a time for which the power supply is maintained in a turned-on state according to the current remaining power amount.

For example, the processor 122 may identify a battery consumption amount for each program by analyzing the battery consumption pattern of an executed program. When a program is executed in the electronic device 100, the processor 122 may determine an estimated usable time for which the power supply of the electronic device 100 is maintained in a turned-on state based on the battery consumption amount of a program that is being executed currently and the current remaining power amount of the battery.

In addition, the processor 122 identifies a program that is frequently executed by analyzing a program execution pattern and predicts an executable program. When the current program is not executed but the executable program is predicted, the processor 122 may determine the estimated usable time for which the power supply of the electronic device 100 is maintained in a turned-on state based on the battery consumption amount and the current remaining power of the battery. Since a time for which the power supply of the electronic device 100 is able to be maintained in a turned-on state with the current battery remaining power amount may be reduced due to reserved programs, such as a function for identifying whether an email is received at predetermined time intervals and an automatic update function, the estimated usable time, for which the power supply of the electronic device 100 is able to be maintained in the turned-on state may be estimated with improved accuracy based on the battery consumption amounts of the programs of which execution is reserved.

As another example, the processor 122 may be directly informed of an estimated remaining usable time (time for which the power supply is able to be maintained in the turned-on state) of battery power by the system for measuring a battery remaining power which is a physical apparatus capable of calculating not only information, such as the capability, the current charge amount, output voltage of the battery, but also the remaining power amount and power consumption pattern of the battery based on the information.

The above-described method for determining the state of the battery, such as the remaining power amount corresponds to the embodiment of the present disclosure. The processor 122 of the electronic device 100 may use multiple methods for measuring the remaining power amount of a battery generally used in the electronic device 100 and determining a power maintenance time in addition to the method for measuring the remaining power amount of the battery and determining the power maintenance time of the electronic device 100.

When the estimated remaining usable time of the battery power (estimated time for which the power supply is maintained in the turned-on state) is compared with a time at which an event should be alarmed to the user and it is determined that the estimated remaining usable time of the battery power is sufficient (in a case where the power supply of the electronic device is able to be maintained in the turned-on state until the event alarm time with the current battery power), the processor 122 enters a normal standby mode without performing the step of transmitting alarm information to the second electronic device in the electronic device 100 and enabling the second electronic device to perform settings.

When the estimated remaining usable time of the battery power is compared with the time at which an event should be alarmed to the user and it is determined that the power supply of the electronic device 100 is not able to be maintained in the turned-on state, the processor 122 proceeds to step 305.

In step 305, the processor 122 alerts the user to connect the electronic device to a battery charger and simultaneously determines whether user starts charging through the battery state checking program 114.

For example, the processor 122 displays an alert message indicating that the battery is insufficient and charging is necessary through the alarm control program 216 on the display unit 160, and sounds an alarm through the audio processing unit 130 and the speaker 131. The processor 122 may determine whether the user starts charging through the battery state checking program 114. In this case, when it is checked that the electronic device 100 is connected to the battery charger and charging is started, the processor 122 stops the step of transmitting the alarm information to the second electronic device in the electronic device 100 and then returns to the normal standby mode.

When charging is not started even in the case where the alert message indicating that the battery is insufficient and charging is necessary is given, the processor 122 proceeds to step 306.

In step 306, the processor 122 determines whether the electronic device 100 is connected to the second electronic device though a network and, when the connection is not established, attempts to connect to the second electronic device.

In order to accomplish the object of the present disclosure, it is important to connect the electronic device 100 to the second electronic device through the network communication. Herein, the network communication includes all communication methods capable of transmitting and receiving data between the electronic device 100 and the second electronic device using, for example, mobile communication, near field wireless communication, wired communication through a communication system.

Although the embodiment is described in which a communication method using wireless resources, such as mobile communication, or near field wireless communication, is characterized, but is not limited thereto.

In order to perform step 306 of connecting to the second electronic device, the processor 122 identifies whether the electronic device 100 is connected to the second electronic device using the communication system 140. In this case, when the electronic device 100 is not connected to the second electronic device through a network, the electronic device 100 may attempt to connect to another second electronic device based on information about a list of second electronic devices to be connected thereto, stored in the data storage unit 112.

In this case, the list of second electronic devices to be connected thereto which is stored in the data storage unit 112 is input from the user in an event alarm setting step and stored. If required, connection priorities may be assigned to the second electronic devices. For example, the processor 122 searches for currently connectable second electronic devices around the electronic device using the communication system 140 in the event alarm setting step of the alarm control program 116 and displays the same on the display unit 160. When the battery is insufficient in the electronic device 100, the user selects a second electronic device which receives event alarm information and performs an alarm function instead. In the event alarm setting step, the number of the second electronic devices that the user wants to select may be one or multiple, and the priorities of second electronic devices may be determined. A plurality of pieces of information input by the user in the event alarm setting step is stored in the data storage unit 112.

The process of step 306 may be also applied to step 411 and step 503 in which the processor 122 identifies whether the electronic device 100 is connected to the second electronic device, and if not connected, attempts to connect to the second electronic device through a network based on information about the list of second electronic devices to be connected thereto, which is input in the above-described alarm setting step and is stored in the data storage unit 112.

When the electronic device 100 is not connected to the second electronic device through step 306, the processor 122 may perform step 403 of resetting an alarm according to information input by the user in the alarm setting step. In addition, when the electronic device 100 is not connected to the second electronic device, the processor 122 may perform step 407 of using a first power-saving mode which enables incensement in the power usable time of the electronic device 100. In addition, the processor may select one of the step of using the first power-saving mode, a step of using a second power-saving mode in which power supply is stopped with respect to many programs and peripherals more than those in the first power-saving mode, and the step of resetting an alarm, and step 409 of performing a combination thereof, and performs the selected step.

On the other hand, when the electronic device 100 is connected to the second electronic device in step 306, the processor 122 proceeds to step 307.

In step 307, the processor 122 transmits the event alarm information to the second electronic device connected to the electronic device. For example, the processor 122 generates event alarm information including pieces of information for alarm setting, such as date, time, repetition times, an alarm repetition time interval, and event specifics and transmits the event alarm information to the second electronic device in order to enable the second electronic device to perform the alarm function.

Herein, the alarm information generated by the electronic device 100 may be configured by an instruction used in common or prearranged by the electronic device 100 and the second electronic device so as to be received and set in the second electronic device without a separate manipulation.

The processor 122 transmits the event alarm information to the second electronic device using network communication, such as mobile communication, WiFi, Bluetooth or NFC.

The second electronic device, which has received the event alarm information, may set an alarm according to the received information without a separate manipulation and perform the alarm function independently regardless of whether the electronic device 100 is exhausted.

When step 307 has been completed, the processor 122 proceeds to step 308.

In step 308, when the processor 122 is not able to transmit the event alarm information to the second electronic device even after connecting to the second electronic device, or receives a feedback indicating that the second electronic device has not set the alarm even after transmitting the event alarm information, the processor 122 determines that the second electronic device is not able to perform the alarm function instead. In this case, the processor 122 may select one of step 403 of resetting an alarm, step 407 of using the first power-saving mode, a step of using the second power-saving mode, and step 409 of performing a combination thereof and perform the same.

When the event alarm information from the electronic device 100 is received and is automatically set in the second electronic device, or a feedback indicating failure of alarm setting is not received from the second electronic device which has received the event alarm in step 308, the processor 122 proceeds to step 309.

In step 309, the processor 122 checks whether the electronic device 100 is connected to a battery charger and charging is started through the battery state checking program 114.

In this case, when the battery charging is not started in the electronic device 100 until an estimated power maintenance time of the electronic device 100, the battery of the electronic device 100 is exhausted and the power supply is stopped before the event alarm time. Also, the alarm set in the electronic device 100 is performed by the second electronic device instead. In this case, step 309 is not meaningful, and the process is ended substantially.

On the other hand, when it is checked that the electronic device 100 is connected to the battery charger and battery charging is started through the battery state checking program 114, the power maintenance time of the electronic device 100 increases, and the electronic device is able to perform the alarm function normally.

In addition, if the alarm function is already set in the second electronic device when it is checked that the battery charger is connected to the electronic device, the electronic device and the second electronic device perform an identical alarm simultaneously at the alarm time. In this case, the processor 122 proceeds to step 313 in order to enable only the electronic device 100 to perform the alarm function.

In step 313, the processor 122 transmits information for cancelling the alarm of the electronic device 100 that is set in the second electronic device to the second electronic device.

After step 307, when the battery charger is connected to the electronic device 100 and the electronic device 100 is ready to perform the event alarm function normally, the processor 122 transmits information (such as date, time, repetition times, an alarm repetition time interval, specifics of the event alarm) about the alarm to be cancelled that is set in the second electronic device which has received the event alarm information to enable the second electronic device to delete the set alarm.

When it is checked that the battery charger is connected and charging is started not only in step 309 but also at any time during the process of FIG. 3A, the processor stops all steps of FIG. 3A and enables the electronic device to operate in a standby mode. In this case, the event alarm function is performed according to what is set in the electronic device 100.

When the processor 122 may display a message associated with processing results on the display unit 160 through the display control unit 290 so as to allow the user to know progress states using the service state checking program 115 when the electronic device 100 transmits the event alarm information to the second electronic device normally or fails transmission, when a feedback is received because the second electronic device does not complete alarm setting according to the event alarm information received from the electronic device 100 without a separate manipulation, or when the electronic device 100 is connected to a battery charger and information for cancellation of the alarm set in the second electronic device, after step 307 using the service state checking program 115.

Figure 7B:
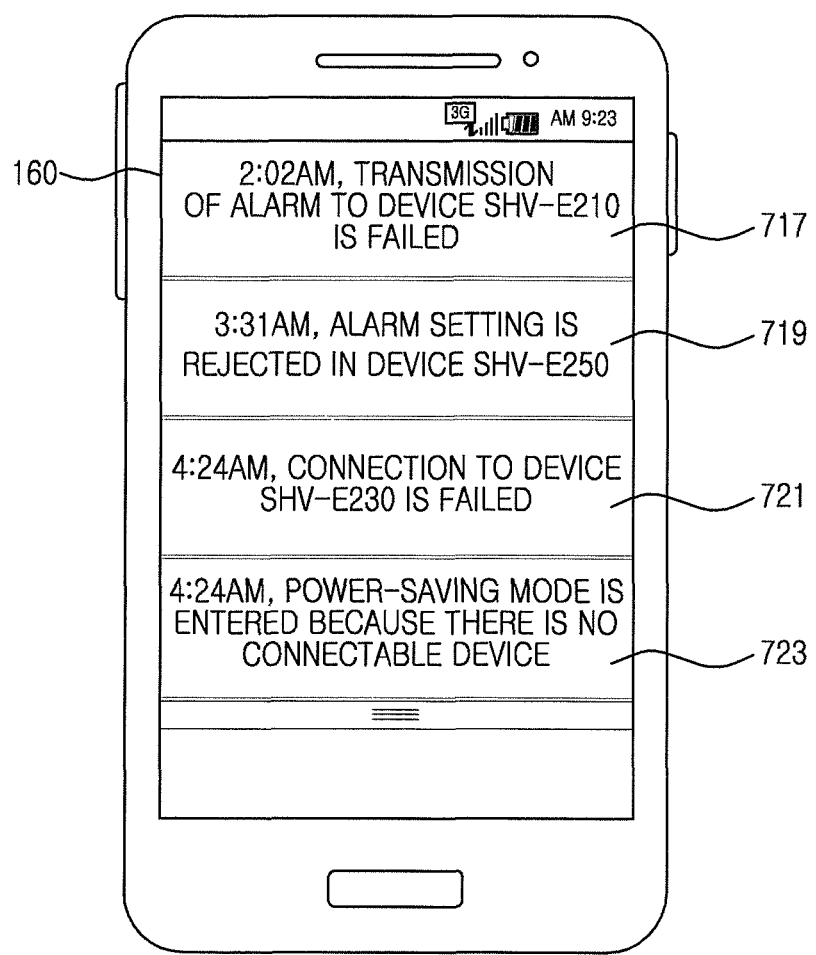
FIG. 7B illustrates another example of displaying a processing result history (feedback) of an alarm function on a display unit in an electronic device according to an embodiment of the present disclosure.

As illustrated in FIGS. 7A and 7B, the processor 122 may display information obtained through the service state checking program 115 on the display unit 160.

FIG. 3A is a flowchart illustrating a process of transmitting an event alarm to a second electronic device in an electronic device 100 according to an embodiment of the present disclosure.

Figure 3B:
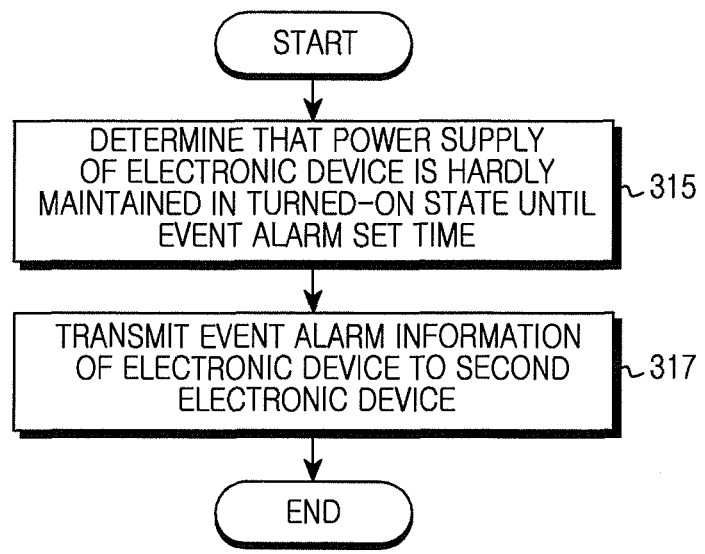
FIG. 3B illustrates a process of transmitting an event alarm to a second electronic device in an electronic device according to an embodiment of the present disclosure.

Referring to FIG. 3B, the processor 122 performs a step 315 of determining that the power supply of the electronic device 100 is not maintained in a turned-on state until an event alarm set time is set and a step 317 of transmitting the event alarm information of the electronic device 100 to the second electronic device.

The step 315 of determining that the power supply of the electronic device 100 is not maintained in a turned-on state until the event alarm set time includes a step 302 of collecting information about the battery remaining power amount of the electronic device 100 and determining a time for which the power supply of the electronic device 100 is maintained in the turned-on state and a step 302 of determining that the power supply of the electronic device is not able to be maintained in the turned-on state until the set event alarm time when the event alarm is set in the electronic device 100.

In addition, when it is determined that the power supply of the electronic device is not able to be maintained in the turned-on state until the event alarm time set in the electronic device 100 (step 302), a step 305 of performing an alert operation of informing the user that it is required to connect a battery charger to the electronic device 100, and a step 305 of determining that the power supply of the electronic device 100 is not able to be maintained in the turned-on state when the user does not connect the battery charger to the electronic device 100 may be further included.

The step 317 of transmitting the event alarm information of the electronic device 100 to the second electronic device includes a step 306 of attempting to connect to the second electronic device using a network communication method including near field wireless communication when it is determined that the battery charger is not connected to the electronic device 100, and a step 307 of generating alarm information which is configured by a prearranged instruction based on the event alarm set in the electronic device 100 and transmitting the same to the second electronic device so as to enable the second electronic device to set the alarm function without a separate manipulation.

Although not illustrated in FIG. 3A, when the user still does not connect the battery charger to the electronic device (step 309) even after the processor 122 generates the alarm information and transmits the same to the second electronic device (step 307), the second electronic device may perform the alarm function according to the event alarm information received from the electronic device 100.

In the process in which the second electronic device performs the alarm function of the electronic device 100 instead, when the battery charger is connected to the electronic device 100 after alarm information about the event alarm set in the electronic device 100 has been transmitted to the second electronic device (step 307), the processor 122 may perform a step (313) of generating an alarm cancel information and transmitting the same to the second electronic device.

Figure 4A:
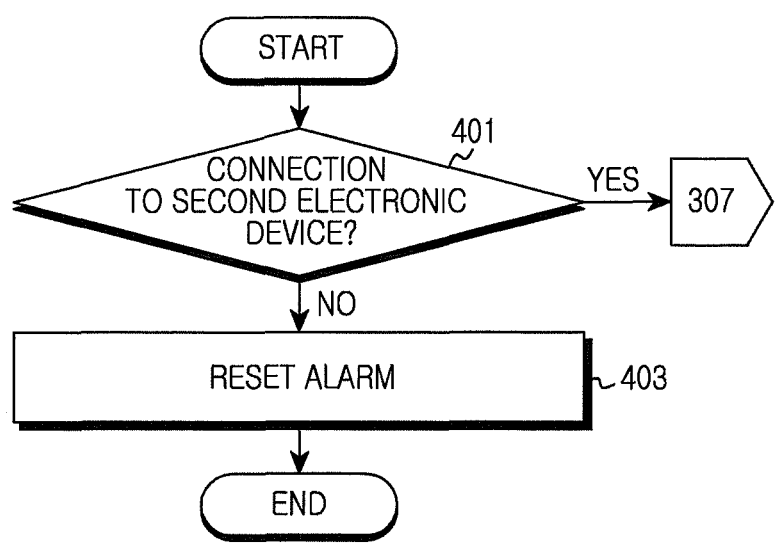
FIG. 4A illustrates a process of resetting an alarm in order to perform an alarm function in an electronic device 100 according to another embodiment of the present disclosure.

FIG. 4A illustrates a process of resetting an alarm in order to perform an alarm function in an electronic device 100 according to another embodiment of the present disclosure.

Referring to FIG. 4A, when the electronic device 100 is not connected to the second electronic device in step 401, the processor 122 proceeds to step 403. When it is checked that the electronic device is connected to the second electronic device, the processor 122 performs step 307 of transmitting the alarm information of the electronic device 100 to the second electronic device.

In this case, the case where the electronic device 100 is not connected to the second electronic device includes a case in which the electronic device 100 is connected to the second electronic device and transmits the alarm information in step 306 or 308 when the alarm information is transmitted and received between the electronic device 100 and the second electronic device, but the second electronic device is not able to set the alarm function for example because the second electronic device does not receive the alarm information completely enough to enable the second electronic device to set the alarm function without a separate manipulation.

In step 403, the processor 122 may reset a condition (alarm) for operating the alarm function set in the electronic device 100 using the battery state checking program 114 and the service state checking program 115.

For example, when the battery generally used in the electronic device 100, such as a lithium polymer battery or a lithium ion battery is completely discharged, the battery cell thereof may be destroyed. Therefore, in order to protect the battery cell, the battery is generally designed to forcibly shut down such the power supply of the electronic device 100 when the charge amount of the battery decreases to be lower than or equal to a reference remaining amount. When the alarm is reset such that the alarm function is forcibly performed a predetermined time before an estimated time at which the power supply of the electronic device 100 is forcibly shut down in order to protect the battery, the electronic device 100 may perform the alarm function immediately before the power supply of the electronic device 100 is shut down.

In this case, it is preferable that the processor 122 transmit the event alarm information to the second electronic device to enable the second electronic device to perform the alarm function of the electronic device 100. However, when the electronic device 100 hardly transmits the alarm information to the second electronic device and the power supply of the electronic device 100 is not maintained in a turned-on state with the battery remaining amount of the electronic device 100 until the event alarm time set in the electronic device 100, the processor performs the step of resetting an alarm in order to perform the alarm function of the electronic device 100 at a time as possible as close to the event alarm time. Therefore, the predetermined time before the power supply of the electronic device 100 is shut down may be one to ten minutes.

In step 403, the processor 122 may further perform a step 407 of performing a first power-saving mode to improve reliability for the alarm of the electronic device 100 in the case of resetting the alarm. The processor 122 ended the process of FIG. 4A when step 403 is completed.

Figure 4B:
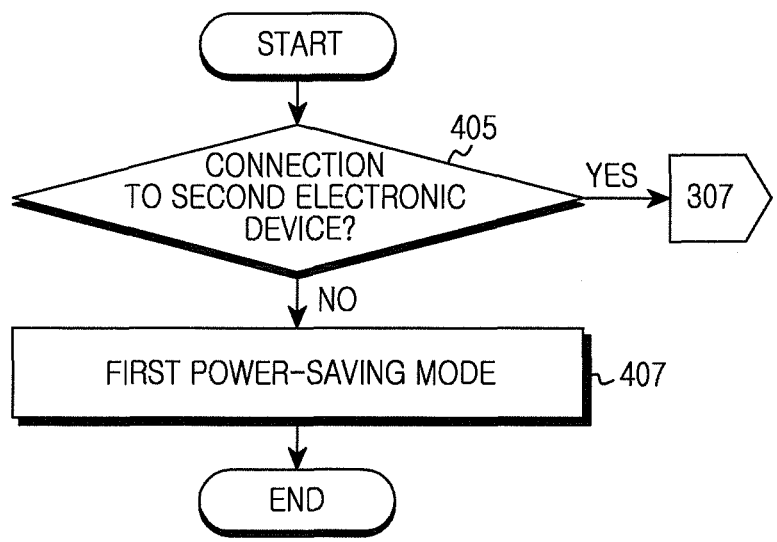
FIG. 4B illustrates a process of performing a power-saving mode in order to perform an alarm function in an electronic device according to another embodiment of the present disclosure.

FIG. 4B illustrates a process of performing a power-saving mode in order to perform an alarm function in an electronic device 100 according to another embodiment of the present disclosure.

Referring to FIG. 4B, when the electronic device 100 is not connected to the second electronic device in step 405, the processor 122 proceeds to step 407. When it is checked that the electronic device is connected to the second electronic device, the processor 122 performs step 307 of transmitting the alarm information of the electronic device 100 to the second electronic device.

In this case, the case where the electronic device 100 is not connected to the second electronic device includes a case in which the electronic device 100 is connected to the second electronic device and transmits the alarm information in step 306 or 308 when the alarm information is transmitted and received between the electronic device 100 and the second electronic device, but the second electronic device is not able to set the alarm function for example because the second electronic device does not receive the alarm information completely enough to enable the second electronic device to set the alarm function without a separate manipulation.

In step 407, the processor 122 may perform a first power-saving mode as an embodiment for performing an alarm function at a time closed to an alarm set time.

The first power-saving mode is to improve reliability for the alarm function by maintaining the power supply of the electronic device 100 in an turned-on state until a time as possible as close to the alarm set time when a setting for transmitting the event alarm of the electronic device 100 to the second electronic device and enabling the second electronic device to perform the alarm function instead is not completed. For example, the processor 122 may terminate operations of programs and peripheral devices unrelated to the alarm function according to the present disclosure and a communication function for connection to the second electronic device based on the battery state checking program 114 and the service state checking program 115, except for programs and devices for basic communication functions such as a telephone function and a message function.

For example, a method for terminating the operation of a program and a method for terminating the operation of a peripheral device may be included.

When the operations of programs are terminated, the processor 122 may perform the power-saving function by transmitting processing signal for enabling termination of the operation of a program. When the program receives the processing signal for program termination, information associated with processing of the program is not loaded any more in the internal memory (RAM) of the electronic device 100, thereby saving power which is consumed to process instructions included in the program by the processor 122 and the memory (RAM) (not illustrated).

As another example for terminating the operation of a program, power which is consumed for processing may be saved by not executing instructions associated with directly unrelated devices within the program. For example, in the first power-saving mode, the telephone function and the message function are performed through a communication system. In addition, the communication system may include a device for near field wireless communication, such as WiFi, Bluetooth and NFC as well as a device for mobile communication for the telephone function and the message function. In this case, the process 122 may decrease power consumption effectively even while using the telephone function and the message function by not executing instructions for near field wireless communication through the communication control program 113.

In addition, when the operation of a peripheral device is terminated, the processor 122 may terminate the operations of devices used for wireless communication directly unrelated to the telephone function and the message function among devices for the communication system. For example, when instructions for near field communication, such as WiFi, Bluetooth and NFC, are set not to be executed through the communication control program 113, there is no need for devices for performing near field communication, such as WiFi, Bluetooth and NFC in the communication system. Therefore, the processor 122 may reduce power consumption in the electronic device 100 by blocking power supplied to devices for performing near field communication, such as WiFi, Bluetooth and NFC through a power management program (not illustrated).

The first power-saving mode may be performed through a well-known power saving method in the electronic device 100 besides the method for terminating the operations of programs and peripheral devices unrelated to the telephone function, the message function and the communication function for connection with the second electronic device.

In addition, when the electronic device operates in the first power-saving mode, the processor 122 may be configured as a separate module to perform functions independently of the processor 122, and may block power supplied to a sensor platform (SSP) that operates. In order to block power supplied to the sensor platform, the method for terminating the operation of a program and the method for terminating the operation of a peripheral device which are described above may be used.

In this case, the sensor platform that operates may include an illuminance sensor, an acceleration sensor, a gyroscope (gyro) sensor, or the like, making it possible to detect the state of the electronic device 100 using digitized information from the sensor platform.

In step 407, the processor 122 may further perform a step 403 of resetting an alarm to improve reliability for the alarm of the electronic device 100 in the case of performing the first power-saving mode. The processor 122 ended the process of FIG. 4B when step 407 is completed.

Figure 4C:
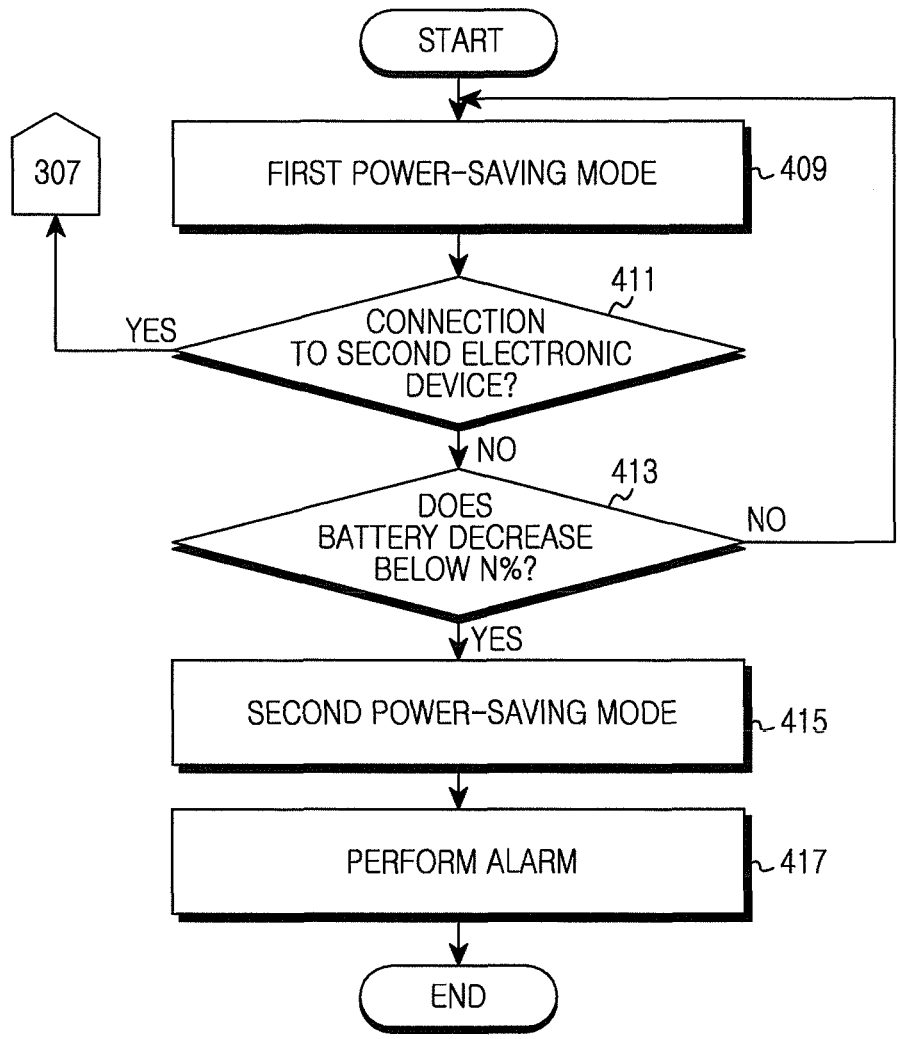
FIG. 4C illustrates a process of performing a power-saving mode and resetting an alarm in order to perform an alarm function in an electronic device 100 according to another embodiment of the present disclosure.

FIG. 4C illustrates a process of performing a power-saving mode and resetting an alarm in order to perform an alarm function in an electronic device 100 according to another embodiment of the present disclosure.

Referring to FIG. 4C, when the electronic device 100 is not connected to the second electronic device, the processor 122 proceeds to step 409 as in FIGS. 4A and 4B.

In this case, the case where the electronic device 100 is not connected to the second electronic device includes a case in which the electronic device 100 is connected to the second electronic device and transmits the alarm information in step 306 or 308 when the alarm information is transmitted and received between the electronic device 100 and the second electronic device, but the second electronic device is not able to set the alarm function for example because the second electronic device does not receive the alarm information completely enough to enable the second electronic device to set the alarm function without a separate manipulation.

In step 409, the processor 122 performs a first power-saving mode as one embodiment for performing an alarm function. The first power-saving mode is to improve reliability for the alarm function by maintaining the power supply of the electronic device 100 in an turned-on state until a time as possible as close to the alarm set time when a setting for transmitting the event alarm of the electronic device 100 to the second electronic device and enabling the second electronic device to perform the alarm function instead is not completed.

As described above, the first power-saving mode is to terminate operations of programs and peripheral devices unrelated to the alarm function according to the present disclosure and a communication function for connection to the second electronic device, except for programs and devices for basic communication functions such as a telephone function and a message function.

The first power-saving mode may be performed through a well-known power saving method besides the method for terminating the operations of programs and peripheral devices unrelated to the telephone function, the message function and the communication function for connection with the second electronic device.

When step 409 has been completed, the processor 122 performs step 411.

In step 411, the processor 122 determines whether the electronic device 100 is connected to the second electronic device. When it is checked that the electronic device is connected to the second electronic device, the processor 122 performs step 307 of transmitting the alarm information of the electronic device 100 to the second electronic device. When the electronic device is not connected to the second electronic device, the processor 122 proceeds to step 413.

In step 413, the processor 122 checks the remaining power amount of a battery periodically to prepare for step 415. For example, the processor 122 periodically identifies programs that consumes power and the battery use amounts of the programs through the battery state checking program 114 and, when the remaining power amount of the battery decrease to be lower than or equal to a predetermined threshold value n %, proceeds to step 415.

In this case, although the predetermined threshold value n % is not specified, the predetermined threshold value n % may be a predetermined numerical value according to the settings of the power management program of alarm control program of the electronic device 100, or a numerical value input by the user. The threshold value n % as determined above may be used to determine whether to enter a second power-saving mode for increasing a power maintenance time than the first power-saving mode. When the remaining power amount of the battery is greater than the threshold value n %, the processor 122 repeatedly performs steps 409 to 413 until the measured remaining power amount of the battery reaches the threshold value n %.

In step 415, the processor performs the second power-saving mode as another embodiment for accomplishing the object of the present disclosure.

The second power-saving mode decreases battery consumption than the first power-saving mode, and may be a mode for terminating all functions except for the alarm function among functions which are not terminated and performed in the first power-saving mode.

For example, when the second power-saving mode is performed, programs and peripheral devices that operate may be limited to the alarm control program 116, the battery state checking program 114 and the service state checking program 115. In the second power-saving mode, power may be blocked which is supplied to remaining programs and peripheral devices including the sensor platform that may always need operate and may be configured as a single module.

In step 415, as examples for blocking power supplied to the program and peripheral devices, the method for terminating the operation of a program and the method for terminating the operation of a peripheral device which are described in step 403 may be used.

The reason why step 415 is performed is that, since there is a possibility that the battery is insufficient and the alarm function is not performed but it is failed to transmit the alarm information to the second electronic device and enable the second electronic device to perform the alarm function instead, it is only solution to maintain the power supply of the electronic device 100 in a turned-on state to enable the electronic device 100 to perform the alarm function.

For example, when the battery is lower than or equal to 1%, the electronic device 100 is likely not to perform even a basic telephone function or message function normally. However, when all functions are terminated except for the alarm function under the above condition, standby power is reduced considerably to increase the power maintenance time of the electronic device 100. Therefore, the possibility of performing the alarm function may be increased through the power maintenance of the electronic device 100. When the battery power of the electronic device 100 has been maintained in the turned-on state until the event alarm time, the processor 122 performs the alarm function at the event alarm time and terminates the alarm control program 116.

Another embodiment may be provided in which devices required to perform the alarm function, such as the audio processing unit 130 and the speaker 131, operate when the alarm is about to be performed to the user even in the second power-saving mode.

In step 415, the processor 122 may further perform a step 403 of resetting an alarm to improve reliability for the alarm of the electronic device 100 in the case of performing the second power-saving mode.

The above-described steps in FIG. 4C may be not essential steps that should be performed. When the electronic device 100 is already in the power-saving mode in the case where step 409 is started according to the embodiment of FIG. 4C, the processor 122 jumps over (omits) step 409 and may proceeds to step 411.

As another example, in step 415 of entering the second power-saving mode, a step of resetting an alarm with the first power-saving mode maintained without performing the second power-saving mode may be further included.

As another example, step 411 and step 413 are omitted and one of the first power-saving mode and the second power-saving mode or a third power-saving mode in which the first power-saving mode and the second power-saving mode are combined may be performed. In this case, a step of resetting an alarm may be further included in the case of performing the third power-saving mode.

In addition, although programs and peripheral devices are in the power-saving mode according to performing of the first power-saving mode of FIG. 4B, the second power-saving mode of FIG. 4C or the third power-saving mode (not illustrated), the processor 122 supplies power to the peripheral devices, transmits a processing signal to the programs to enable the programs to operate, or generates settings to execute the instructions of the programs, enabling the programs and the peripheral devices which are in the power-saving mode to be used again. The above case may be also applied to the power-saving steps of FIG. 4A and FIG. 4B as well as that of the FIG. 4C.

Figure 5:
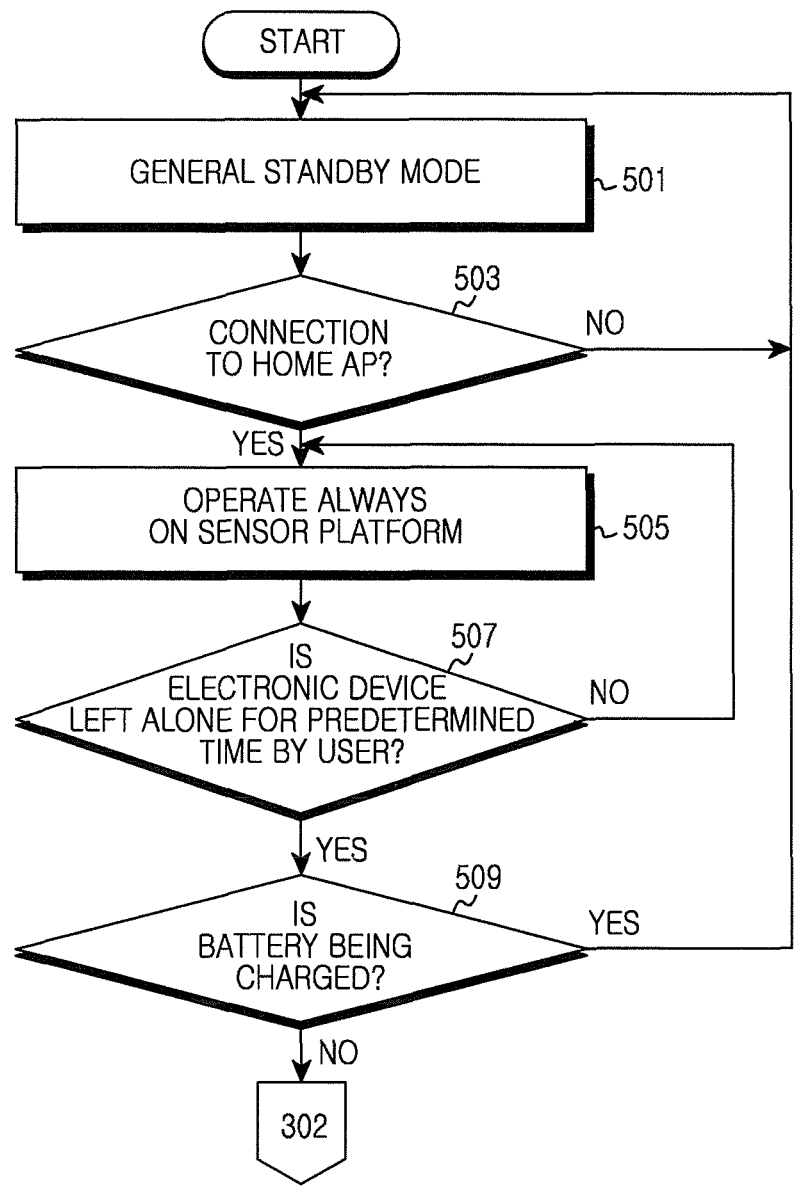
FIG. 5 illustrates a process of performing an alarm function in an electronic device 100 according to another embodiment of the present disclosure.

FIG. 5 illustrates a process of performing an alarm function in an electronic device 100 according to another embodiment of the present disclosure.

FIG. 5 illustrates an embodiment of determining a time at which alarm information is transmitted to a second electronic device. As an example of the present disclosure, the processor 122 may determine whether the alarm function is able to be performed with the current remaining power amount of a battery when it is determined that the electronic device 100 is left alone for a predetermined time period by the user.

In step 501, the processor 122 maintains the electronic device 100 in a general standby mode.

For example, the general standby mode refers to a mode in which the power supply of the electronic device 100 is maintained in a turned-on state to allow a user to execute a desired service with simple manipulation, or to allow the user, at any time, to check and manipulate the states of programs that are already loaded in the memory 110 and are being executed in the electronic device 100 that provides various services, such as not only a voice communication function but also a camera function, a data communication function, a video replay function, an audio replay function, a messenger function, a scheduling function, and an alarm function.

When the electronic device 100 is maintained in the general standby mode, the processor 122 proceeds to step 503.

In step 503, the processor 122 determines whether the state of the electronic device 100 satisfies a predetermined condition input by the user though the alarm control program 116 before proceeding to step 505.

As an example of the condition, the processor 122 determines whether the electronic device 100 is connected to the second electronic device through a network in step 503. In this case, the processor 122 attempts to connect to a connectable second electronic device according to predetermined priorities.

The processor may determine whether the electronic device 100 is connected to the second electronic device though the network is determined based on information stored in the data storage unit 116, and when the electronic device 100 is not connected to the second electronic device, performs the step of attempting to connect to the second electronic device though the network according to the method as in step 306.

When the electronic device 100 is connected to the second electronic device, the processor 122 proceeds to step 505.

As another example, in step 503, the processor 122 determines whether the electronic device 100 is located within a specific range through a GPS (not illustrated) module. For example, the processor 122 determines whether the location of the electronic device 100 identified by the GPS (not illustrated) falls within a location range input by the user in the alarm setting step of the alarm control program 116. An example of the location range input by the user in the alarm setting step may be set as within an m radius from the location of the electronic device 100 identified by the GPS (not illustrated).

As another example of determining whether the electronic device 100 is located with the specific range, various methods capable of identifying the location of the electronic device 100 by using a base station or a router may be used instead of the method using a GPS.

When it is determined that the electronic device 100 is located within the specific range input by the user through the alarm control program 115, the processor 122 proceeds to step 505.

As another condition, in step 503, the processor 122 determines whether a time set through a time setting step is arrived. For example, the processor receives a specific time input from the user through the alarm setting step of the alarm control program 116 and stores the same in the data storage unit 112. The processor 122 determines whether the specific time stored in the data storage unit 112 through the alarm control program 116 is matched with the time of the electronic device 100. When the specific time stored in the data storage unit 112 is matched with the time of the electronic device 100, the processor 122 proceeds to step 505.

Various embodiments have been described which the electronic device 100 needs to satisfy to proceed from step 503 to step 505. Although one condition of "connection to Home AP" 503 is illustrated in FIG. 5 as a condition for proceeding from step 503 to step 505 in order to accomplish the present disclosure, one of various conditions is only used or two or more conditions may be used.

In step 505, the processor 122 collects the state information of the electronic device 100 using various types of sensors included in the electronic device 100 in order to determine whether the electronic device 100 is left alone. For example, a sensor platform that operates independently of the state of the processor 122 may be used for the sensors that are used. In this case, the sensor platform that operates independently may be configured as an independent module.

In addition, in the step of transmitting the event alarm according to the present disclosure, the sensors capable of detecting the states of the electronic device 100 may always need to operate, and therefore, the sensor platform that operate always may be used. Since the sensor platform that is configured independently and may always operate is configured separately from the processor and operates, the sensor platform enables low-power operation and is benefit for the power-saving function provided by the present disclosure. Although the sensors are not illustrated, various methods capable of representing the state information of the electronic device 100, such as an illuminance sensor, an acceleration sensor and a gyroscope, may be included.

In addition, digitized information from the sensor platform as well as the time information of the electronic device 100 may be used for detection of the states of the electronic device 100.

When collection of state information of the electronic device 100 is started, the processor 122 identifies the state of the electronic device 100 in step 507.

Figure 6:
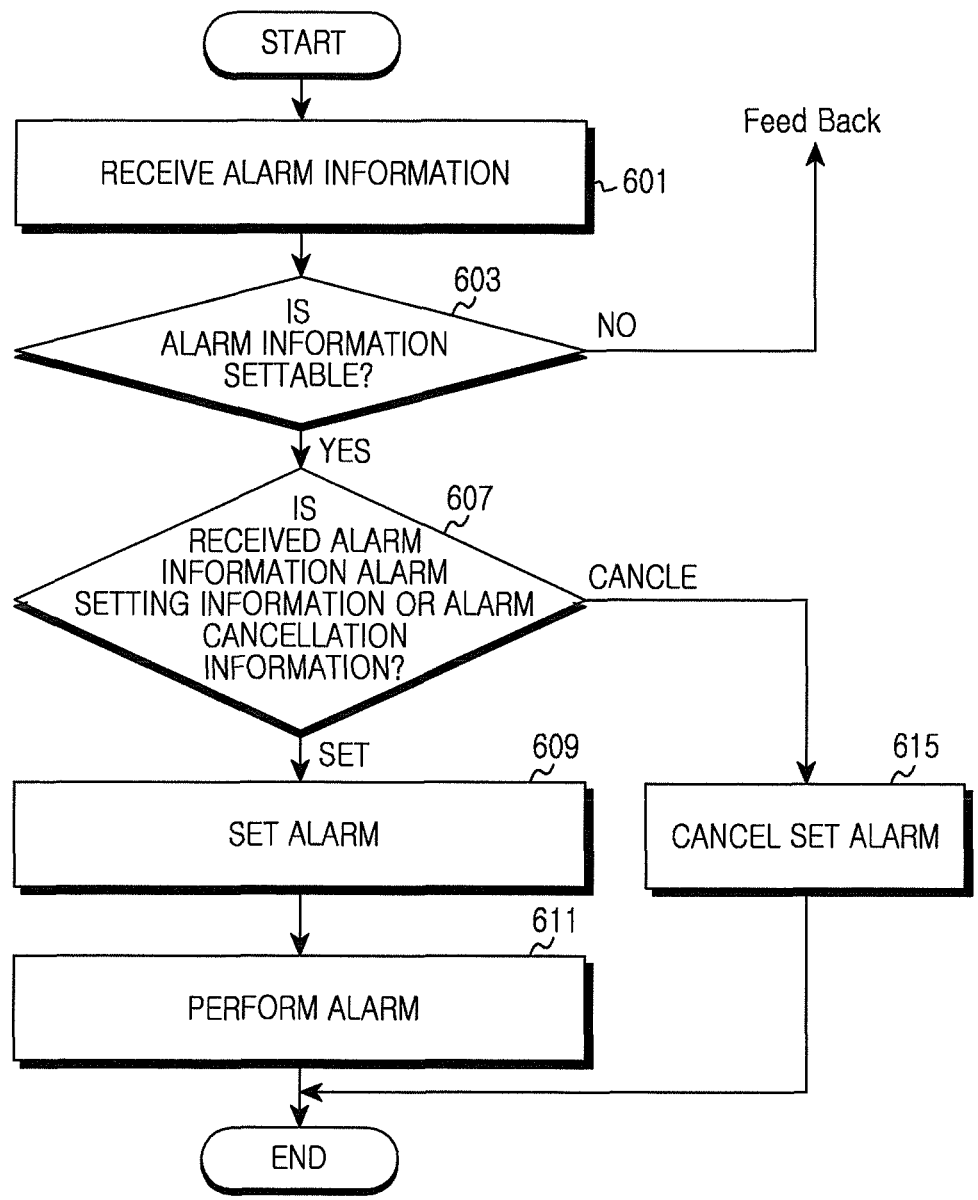
FIG. 6 illustrates a process of receiving alarm information and performing an alarm function in an electronic device according to an embodiment of the present disclosure.

For example, the processor 122 compares the digitized state information of the electronic device 100 from the sensor platform that may always operate with a predetermined condition and determines whether the digitized state information is matched with the predetermined condition in a step of setting an alarm before the flowcharts of FIG. 3 to FIG. 4 and FIG. 6.

As a specific example, the processor 122 receives predetermined conditions associated with various types of sensors from the user through the setting step of the alarm control program 116 and stores the same in the data storage unit 112. The conditions associated with the sensors may include a threshold time period for which the illuminance sensor is exposed to darkness, a threshold time period for which the acceleration sensor or the gyroscope does not detect the movement of the electronic device 100. The user may generate settings to use only one of various types of sensors or a combination of two or more sensors. When sensor information input from the user and stored in the data storage unit 112 is matched with the digitized state information of the electronic device 100 from the sensor platform, the processor 122 determines that the electronic device is left alone and proceeds to step 509.

As another example, in step 503, the processor 122 determines whether a predetermined time set in the electronic device 100 has been reached. For example, the processor receives the predetermined time input from the user through the alarm setting step of the alarm control program 116 and stores the same in the data storage unit 112. The processor 122 determines whether the specific time stored in the data storage unit 112 through the alarm control program 116 is matched with the time of the electronic device 100. When the specific time stored in the data storage unit 112 is matched with the time of the electronic device 100, the processor 122 determines that the electronic device is left alone from the user and proceeds to step 509.

That is, in the above-described embodiment in which the time information of the electronic device 100 and the digitized information from the sensor platform are used respectively or in combination, the processor 122 may perform a step of determining whether the electronic device 100 is left alone for a predetermined time, an example of which is the sleeping of the user.

In step 509, the processor 122 checks whether the battery is being charged or the user starts charging of the battery through the battery state checking program 114.

For example, when determining that the battery charger is connected to the electronic device 100 and the battery is being charged through the battery state checking program 116, the processor 122 determines that the electronic device 100 will perform the event alarm function normally. In this case, it is not meaningful to transmit the event alarm information to the second electronic device and enable the second electronic device to perform the alarm function instead. Therefore, in this case, the processor 122 proceeds to the general standby mode 501 without performing all steps in FIG. 3 to FIG. 4 and FIG. 6 according to the present disclosure.

When the processor 122 determines that the battery charger is not connected to the electronic device 100 and the battery is not being charged through the battery state checking program 116, there is a possibility that the remaining power amount is insufficient and the alarm function is not performed at the event alarm time. In order to prevent the above situation according to the present disclosure, the processor 122 proceeds to step 302 to perform the embodiment of the present disclosure.

FIG. 6 illustrates a process of receiving alarm information and performing an alarm function in an electronic device 100 according to an embodiment of the present disclosure.

In step 601, the processor 122 receives alarm information transmitted from a second electronic device. For example, the electronic device 100 may receive a message (alarm information which enables the electronic device 100 to perform an alarm function instead of the second electronic device according to the present disclosure, as well as various types of data including information for a telephone function using mobile communication, text message information, and information received through a home AP, from the second electronic device.

When the message information is received, the electronic device 100 extracts information about the event alarm from various types of data through the processor 122 and performs an alarm setting step through the alarm control program 116 in order to set and perform the event alarm information received from the second electronic device according to the present disclosure.

In addition, the processor 122 may analyze the event alarm information from the outside and determine whether to perform a process of setting the alarm function and performing an alarm according to the alarm information received by the electronic device 100 instead of the second electronic device or to cancel the process without performing the same based on information about the alarm stored in the data storage unit 112. For example, when the event alarm information generated and transmitted by the second electronic device is associated with a plurality of electronic devices 100, or when there is a third electronic device which does not want to receive the event alarm information, the electronic device 100 has a possibility of performing an unnecessary alarm function when the electronic device 100 performs settings according to the event alarm information received from the second electronic device and performs the alarm function instead of the second electronic device. In order to prevent the above situation, the electronic device 100 receives, previously from the user, information indicating whether to perform a step of setting and performing an alarm instead according to the alarm information transmitted by a specific or unspecified second electronic device and stores the same in the data storage unit 112. Therefore, the processor 122 may determine whether to perform the step of performing an alarm function instead in the electronic device 100 according to the alarm information received from the second electronic device based on the information stored in the data storage unit 112 when receiving the alarm information from the second electronic device.

When step 601 has been completed, the processor 122 proceeds to step 603.

In step 603, the processor 122 determines whether the received event alarm information is configured by information that enables alarm setting. For example, when error is included in the event alarm information received from the second electronic device, or there is a problem in compatibility with the electronic device 100, the electronic device 100 is not able to set the alarm, thereby making it impossible to perform the alarm function of the second electronic device instead. In addition, when there is no error in the alarm information but the alarm information is not configured by an instruction that is prearranged between the electronic device 100 and the second electronic device so as to set the alarm function automatically without a separate manipulation, the electronic device 100 is not able to perform the alarm function because the alarm is not set according to the received information.

In this case, when the battery of the second electronic device is exhausted and the power supply thereof is turned off, the user is not provided with the event alarm. In order to prevent the above situation, when the event alarm information which does not enable the setting of the alarm is received, the electronic device 100 transmits a feedback representing this situation to the second electronic device. In this case, the second electronic device performs an alternative method, such as connecting to a third electronic device according to information received upon the alarm setting or alarm resetting, thereby improving reliability of the alarm function.

When the received event alarm information is configured by information that enables alarm setting without a separate manipulation, the processor 122 proceeds to step 607.

In step 607, the processor 122 analyzes the received event alarm information and extracts data for alarm setting. The data for alarm setting may include information such as date, time, alarm repetition times, an alarm repetition time interval, why the event alarm is set, whether the alarm is for alarm setting, and whether the alarm is for alarm cancelling. When the step has been completed, the processor 122 proceeds to step 609 when it is determined that the alarm is for alarm setting and proceeds to step 615 when it is determined that the alarm is for alarm cancelling, based on the analyzed information.

In step 609, the processor 122 sets the alarm and enters an alarm standby mode based on the information analyzed in step 605 through the alarm control program 116.

When an alarm set time has been reached, the processor 122 performs the alarm function (step 611). When the alarm function is performed, the processor deletes the completed alarm information and terminates the alarm control program 116.

On the other hand, in step 615, the processor 122 cancels and deletes the alarm set based on the information analyzed in step 605 through the alarm control program 116 and terminates the alarm control program 116.

FIG. 7A illustrates an example of displaying a processing result history (feedback) of an alarm function on the display unit 160 in the electronic device 100 according to an embodiment of the present disclosure.

Referring to FIG. 7A, the processor 122 may display state information about a process of setting an event alarm in a second electronic device on the partial region of the display unit 160 of the electronic device 100.

In order to transmit the event alarm information to the second electronic device, the processor 122 may receive selection with respect to one or more second electronic devices from a user in the step of setting the event alarm and determine the priorities of the selected second electronic devices. In this case, the electronic device 100 connects to the second electronic device according to the predetermined priorities as described with reference to FIG. 3 to FIG. 5 and then displays information about a process of enabling the connected second electronic device to set the event alarm.

For example, the processor 122 receives and displays a feedback (step 711) indicating that the event alarm information is transmitted to the second electronic device shv-e210 but the second electronic device shv-e210 does not set the alarm function as illustrated in FIG. 7A.

In this case, the second electronic device shv-e210 is a first priority of second electronic device among the one or more second electronic devices selected by the user in the step of setting the event alarm. Similarly, in the following description, other second electronic devices having the priorities may refer to a second priority of second electronic device, a third priority of second electronic device, and the like.

In addition, when the alarm is not set in the first priority of second electronic device shv-e210, the processor 122 may transmit the event alarm to the second priority of second electronic device shv-e250 to enable the second priority of second electronic device shv-e250 to set the event alarm.

When receiving a feedback indicating that the alarm transmitted from the electronic device 100 has not been set in the second priority of second electronic device shv-e210, the electronic device may display information associated with a feedback indicating that the event alarm has not been set although not illustrated.

On the other hand, when receiving a feedback indicating that the alarm transmitted from the electronic device 100 has been set in the second priority of second electronic device shv-e210, the electronic device may display information associated with a received feedback (713).

When a battery charger is connected to the electronic device 100 after the processor 122 transmits alarm information to the second electronic device and the second electronic device sets the alarm function, the electronic device 100 is able to perform the alarm function normally. Therefore, since the second electronic device does not need to perform the alarm function instead, the processor 122 may perform a step of cancelling the alarm of the electronic device 100 set in the second electronic device.

Therefore, the processor 122 may display information (715) about a feedback associated with a process of transmitting information for cancelling of the set alarm to the second priority of second electronic device shv-e250 in which the alarm is set to enable the second electronic device shv-e250 to cancel the set alarm.

FIG. 7B illustrates another example of displaying a processing result history (feedback) of an alarm function on the display unit 160 in the electronic device 100 according to an embodiment of the present disclosure.

Referring to FIG. 7B, the processor 122 may display information about a process of setting an event alarm in a second electronic device on the partial region of the display unit 160 of the electronic device 100.

In order to transmit the event alarm information to the second electronic device, the processor 122 may receive selection with respect to one or more second electronic devices from a user in the step of setting the event alarm and determine the priorities of the selected second electronic devices. In this case, the processor 122 may display information indicating that the processor 122 fails to connect to the second electronic device according to the predetermined priorities as described with reference to FIG. 3 to FIG. 5 and then enters a power-saving mode.

For example, the processor 122 may display (717) a feedback in a case where information about the event alarm is transmitted to the second electronic device shv-e210 but the second electronic device fails to receive the information or the second electronic device shv-e210 does not receive the event alarm information completely.

In this case, the second electronic device shv-e210 is a first priority of second electronic device among the one or more second electronic devices selected by the user in the step of setting the event alarm. Similarly, in the following description, other second electronic devices having the priorities may refer to a second priority of second electronic device, a third priority of second electronic device, and the like.

When there is generated a feedback indicating that the first priority of second electronic device shv-e210 receives the event alarm information transmitted by the processor 122 but the event alarm information is not complete enough for the first priority of second electronic device shv-e210 to set the alarm function without a separate manipulation is received, the processor 122 may again transmit the information about the event alarm to the first priority of second electronic device shv-e210.

On the other hand, when the first priority of second electronic device shv-e210 does not completely receive the event alarm information transmitted by the processor 122 due to a problem such as the unstable state of network communication between the electronic device 100 and the first priority of second electronic device shv-e210, the processor 122 may transmit the event alarm to the second priority of second electronic device shv-e250 to enable the second priority of second electronic device shv-e250 to set the event alarm.

In addition, the processor 122 may display information about a feedback associated with a case where the information about the event alarm is transmitted to the second priority of second electronic device shv-e250 and is received by the second electronic device shv-e250, but the second electronic device shv-e250 rejects alarm setting because the event alarm information is not received normally.

In this case, the erroneous reception of normal alarm information includes a state in which the second electronic device shv-e250 is not able to set the alarm function without a separate manipulation for example, because the event alarm information received by the second electronic device shv-e250 is not configured by an instruction prearranged with the electronic device 100.

In addition, when network communication is impossible for example because the processor 122 attempts to connect to a third priority of second electronic device shv-e230 in order to transmit the event alarm information to the third priority of second electronic device but fails to connect thereto, the processor 122 display (721) information about the above situation.

As described above, when the processor 122 attempts to able the second electronic devices to perform the alarm function of the electronic device 100 instead by transmitting the event alarm according to the priorities of the second electronic devices previously set by the user but fails all attempts with respect to all of the second electronic devices, the electronic device 100 may not enable the second electronic device to perform the alarm function through transmission of the alarm information.

In this case, as another method for improving reliability in the alarm function, the processor 122 selects, in the alarm setting step, one of a method for resetting alarm (405) a method for performing (407) a power-saving mode for decreasing a battery use amount and a method for performing the alarm resetting and the power-saving mode both in FIG. 4, and performs the selected method. In this case, the processor 122 displays information (723) indicating that the above-described operation is performed to enable the user to perceive it.

Figure 8:
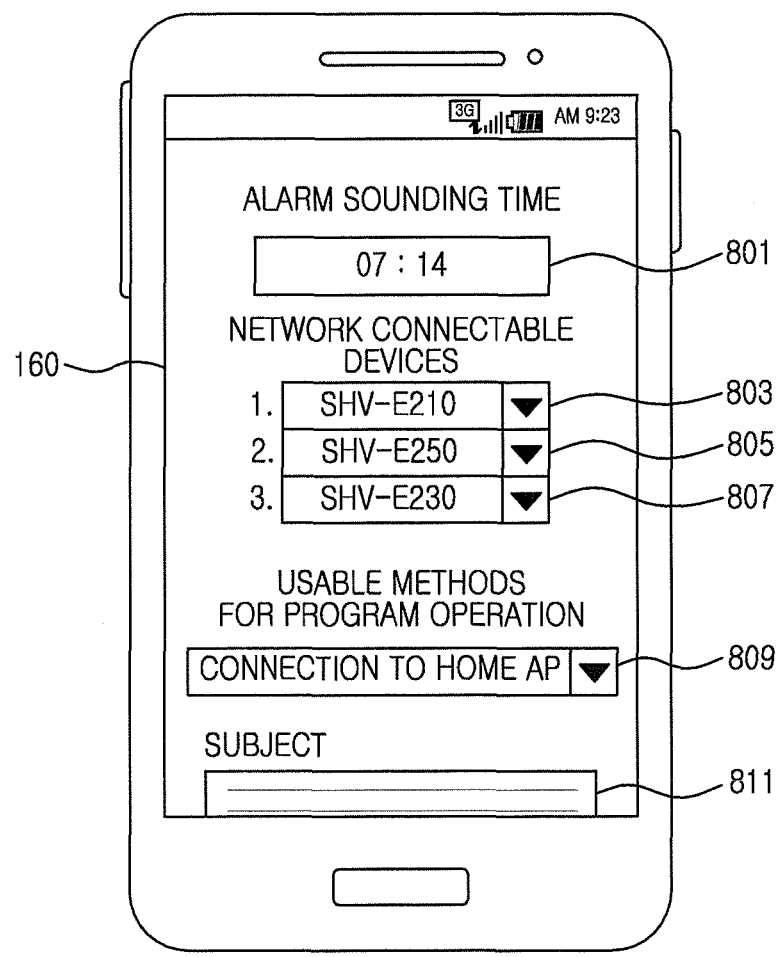
FIG. 8 illustrates a representative example of a setting menu that may be used in an electronic device 100 according to an embodiment of the present disclosure.

FIG. 8 illustrates a representative example of a setting menu that may be used in an electronic device 100 according to an embodiment of the present disclosure.

As illustrated in FIG. 8, the processor 122 may display a menu for setting of an event alarm on the display unit 160 of the electronic device 100 so as to receive information about the event alarm from a user and set an alarm function.

For example, the processor 122 may display (801) a menu for selection of time information to receive an event alarm time. Although not illustrated in FIG. 8, the processor may display a menu for enabling a user to select information about date as well as time if necessary, or to directly input the information.

In addition, when the power supply of the electronic device 100 is not maintained in a turned-on state until the event alarm time with the remaining power amount of a battery, the processor 122 may display menus 803, 805 and 807 for selection of a second electronic device to which the event alarm information will be transmitted. One or more than two of the second electronic devices to which the event alarm information will be transmitted may be selected by the user and stored. When more than two of the second electronic devices are stored, the priorities thereof may be determined by the user and stored.

In the process of setting the event alarm, in order to perform the step of selecting the second electronic device, the processor 122 searches for connectable devices around the electronic device through network communication, displays a list of the connectable devices 803, 805 and 807 around the electronic device 100 for selection on the display unit 160, and receives selection for a desired second electronic device among the list of the found second electronic devices.

In addition, the processor 122 may display a menu 809 for reception of conditions for starting steps of measuring the remaining power amount of the battery of the electronic device 100, connecting the electronic device 100 to the second electronic device, and transmitting the event alarm information to the second electronic device in the event alarm setting step.

The reason to receive the conditions is to start the steps in a situation desired by the user. In addition, it is prevented to attempt to connect to the second electronic device or to transmit the event alarm information by performing the steps in an unnecessary situation.

The condition may be set to use one or combination of conditions including a condition of identification of whether the electronic device 100 is connected to the second electronic device, a condition of identification of whether the electronic device 100 is located within a specific range using methods for identifying the location of the electronic device 100 using a GPS, a base station or a router and a condition of identification of whether a specific time has been reached through a time setting step.

In addition, the processor 122 may display an area 811 in which the user may perform input with respect to a reason why an alarm is set, including information about an event or a schedule on the menu.

Although not illustrated, the processor 122 may display at least one of pieces of information including times of alarm repetition and a time interval between alarms when the alarm is set to be repeated, as setting information about the event or schedule which the user wants to be informed of.

The methods according to the embodiments described in the claims and/or specification of the present disclosure may be implemented by hardware, software, or a combination thereof.

When the methods are implemented by software, a computer-readable storage medium may be provided to store one or more programs (software modules). The one or more programs stored in the computer-readable storage medium may be configured for execution by one or more processors in an electronic device 100. The one or more programs may include instructions for causing the electronic device 100 to execute the methods according to the exemplary embodiments described in the claims or specification of the present disclosure.

These programs (software modules or software) may be stored in random access memories (RAMs), nonvolatile memories including flash memories, read only memories (ROMs), electrically erasable programmable ROMs (EEPROMs), magnetic disc storage devices, compact disc-ROMs (CD-ROMs), digital versatile discs (DVDs), other types of optical storage devices, or magnetic cassettes. Also, the programs may be stored in a memory configured by a combination of some or all of such storage devices. Also, each of the memories may be provided in plurality.

Also, the programs may be stored in an attachable storage device that may be accessed by the electronic device through a communication network such as Internet, Intranet, local area network (LAN), wireless LAN (WLAN), or storage area network (SAN), or through a communication network configured by a combination thereof. Such storage device may be connected to the electronic device 100 through an external port.

Furthermore, a separate storage device in the communication network may access a portable electronic device 100.

For example, although the SIM card having eight contact pads and the socket having six connection terminals are described above, the present disclosure is not limited thereto. For example, various card-type devices may be used in addition to the SIM card including less than or more than eight contact pads. Various sockets corresponding thereto, or connection terminals provided directly in the PCB of the electronic device may be applicable.

While the disclosure has been shown and described with reference to certain exemplary embodiments thereof, it will be understood by those skilled in the art that various changes in form and details may be made therein without departing from the spirit and scope of the disclosure as defined by the appended claims. Therefore, the scope of the disclosure is defined not by the detailed description of the disclosure but by the appended claims, and all differences within the scope will be construed as being included in the present disclosure.

What is claimed is:

1. A method of operating an electronic device, the method comprising:
    determining whether an amount of remaining battery power of the electronic device is lower than or equal to a reference amount, wherein the reference amount is based on power supply of the electronic device being maintained in a turned-on state until a time when an alarm is set to be activated; and
    transmitting alarm information about the alarm to a second electronic device,
    wherein the alarm information includes information configured by an instruction prearranged between the electronic device and the second electronic device to enable the second electronic device to automatically set an alarm function according to the alarm information after reception of the alarm information.

2. The method of claim 1, wherein determining whether the amount of remaining battery power of the electronic device is lower than or equal to the reference amount comprises using at least one of a method of using a power maintenance time based on battery usage information for a program of the electronic device or a method of using a system for measuring a remaining power amount which is physically installed to a battery of the electronic device.

3. The method of claim 1, wherein transmitting the alarm amount comprises connecting to the second electronic device using a near field wireless communication method.

4. The method of claim 1, wherein the alarm information includes at least one of an time, an date, a reason why the alarm is set, alarm repetition times, or an alarm repetition time interval.

5. The method of claim 1, further comprising transmitting information for cancellation of settings associated with the alarm to the second electronic device in which the alarm is set.

6. The method of claim 1, further comprising receiving second alarm information from the second electronic device or a third electronic device and performing an alarm function instead according to the second alarm information of the second electronic device or the third electronic device.

7. The method of claim 1, further comprising resetting the alarm set in the electronic device when transmitting the alarm information about the alarm to the second electronic device failed.

8. The method of claim 1, further comprising:
receiving feedback associated with a processing result of the alarm information from the second electronic device after transmitting the alarm information to the second electronic device: and
retransmitting the alarm information to the second electronic device, transmitting the alarm information to a third electronic device having a next priority after that of the second electronic device, or resetting the alarm set in the electronic device in response to identifying that the feedback indicates that the second electronic device fails to set the alarm function.

9. The method of claim 8, further comprising:
transmitting information for cancellation of settings associated with the alarm to the second electronic device or the third electronic device in which the alarm is set; and
displaying a first indication in a display unit after the electronic device transmits the alarm information to the second electronic device or the third electronic device,
wherein the first indication includes at least one among information about an operation of transmitting the alarm information about the alarm to the second electronic device, information about an operation of transmitting information for cancellation of settings associated with the alarm to the second electronic device and the third electronic device in which the alarm is set, information about the feedback when the feedback is received, an operation of retransmitting the alarm information to the second electronic device after the feedback is received, information about an operation of transmitting the alarm information to the third electronic device having a next priority after that of the second electronic device after the feedback is received, or information about an operation of resetting a time of the alarm set in the electronic device.

10. The method of claim 1, further comprising determining whether information representing a state of the electronic device satisfies a predetermined condition before determining whether the amount of remaining battery power of the electronic device is lower than or equal to the reference amount,
wherein, the predetermined condition includes at least one of time data of the electronic device, illuminance data around the electronic device, magnitude data of impact applied to the electronic device, magnitude data of vibration corresponding to the impact magnitude, magnitude data of acceleration corresponding to the impact magnitude, tilt data of the electronic device, or rotation inertia magnitude of the electronic device.

11. An electronic device comprising:
a communication system configured to perform communication with a second electronic device;
at least one processor; and
a memory configured to store at least one program, wherein the processor is configured to execute program code of at least the one program to:
determine whether an amount of remaining battery power of the electronic device is lower than or equal to a reference amount, and control the communication system to transmit alarm information about the alarm to the second electronic device,
wherein the alarm information includes information configured by an instruction prearranged between the electronic device and the second electronic device to enable the second electronic device to automatically set an alarm function according to the alarm information after reception of the alarm information.

12. The electronic device of claim 11, wherein the processor is configured to execute program code of at least the one program to determine whether the amount of remaining battery power of the electronic device is lower than or equal to the reference amount using at least one of a method of using a power maintenance time based on battery usage information for a program of the electronic device or a method of using a system for measuring a remaining power amount which is physically installed to a battery of the electronic device.

13. The electronic device of claim 11, wherein the processor is configured to execute program code of at least the one program to connect to the second electronic device using a near field wireless communication method.

14. The electronic device of claim 11, wherein the processor is configured to execute program code of at least the one program to configure and cause the communication system to transmit the alarm information including at least one of an alarm time, an alarm date, a reason why the alarm is set, alarm repetition times, or an alarm repetition time interval.

15. The electronic device of claim 11, wherein the processor is configured to execute program code of at least the one program to cause to communication system to transmit information for cancellation of settings associated with the alarm to the second electronic device in which the alarm is set.

16. The electronic device of claim 11, wherein the program comprises an instruction for receiving second alarm information from the second electronic device or a third electronic device and performing an alarm function instead according to the second alarm information of the second electronic device or the third electronic device.

17. The electronic device of claim 11, wherein the processor is configured to execute program code of at least the one program to reset the alarm set in the electronic device when transmitting the alarm information about the alarm to the second electronic device failed.

18. The electronic device of claim 11, wherein the processor is configured to execute program code of at least the one program to:
identify feedback associated with a processing result of the alarm information received from the second electronic device after transmission of the alarm information to the second electronic device: and cause the communication system to retransmit the alarm information to the second electronic device, transmit the alarm information to a third electronic device having a next priority after that of the second electronic device, or reset the alarm set in the electronic device in response to identifying that the feedback indicates that the second electronic device fails to set the alarm function.

19. The electronic device of claim 18, wherein the processor is configured to execute program code of at least the one program to:
cause the communication system to transmit information for cancellation of settings associated with the alarm to the second electronic device or the third electronic device in which the alarm is set; and
cause a display unit to display a first indication after the electronic device transmits the alarm information to the second electronic device or the third electronic device,
wherein the first indication includes at least one among information about an operation of transmitting the alarm information about the alarm to the second electronic device, information about an operation of transmitting information for cancellation of settings associated with the alarm to the second electronic device and the third electronic device in which the alarm is set, information about the feedback when the feedback is received, an operation of retransmitting the alarm information to the second electronic device after the feedback is received, information about an operation of transmitting the alarm information to the third electronic device having a next priority after that of the second electronic device after the feedback is received, or information about an operation of resetting a time of the alarm set in the electronic device.

20. The electronic device of claim 11, wherein the processor is configured to execute program code of at least the one program to determine whether information representing a state of the electronic device satisfies a predetermined condition before determining whether the amount of remaining battery power of the electronic device is lower than or equal to the reference amount,
wherein, the predetermined condition includes at least one of time data of the electronic device, illuminance data around the electronic device, magnitude data of impact applied to the electronic device, magnitude data of vibration corresponding to the impact magnitude, magnitude data of acceleration corresponding to the impact magnitude, tilt data of the electronic device, or rotation inertia magnitude of the electronic device.

* * * * *